United States Patent [19]
Brandenberg

[11] Patent Number: 6,012,591
[45] Date of Patent: Jan. 11, 2000

[54] APPARATUS FOR SUPPORTING MODULAR AND COOPERATING COMPONENTS

[76] Inventor: Carl Brock Brandenberg, FM 3450, Box 188, Cresson, Tex. 76035

[21] Appl. No.: 09/072,904

[22] Filed: May 5, 1998

Related U.S. Application Data

[63] Continuation of application No. 08/786,325, Jan. 23, 1997, Pat. No. 5,746,334.

[51] Int. Cl.⁷ ........................................................ A47F 7/00
[52] U.S. Cl. ................................................................ 211/26
[58] Field of Search ..................................... 211/196, 205, 211/26, 107, 110, 116

[56] References Cited

U.S. PATENT DOCUMENTS

| | | | |
|---|---|---|---|
| 3,076,557 | 2/1963 | Husted et al. | 211/196 |
| 3,648,892 | 3/1972 | Morgan | 211/205 |
| 5,178,286 | 1/1993 | Allison, III | 211/205 |
| 5,318,175 | 6/1994 | Stevens | 211/196 |

*Primary Examiner*—Alvin Chin-Shue
*Assistant Examiner*—Sarah Purol
*Attorney, Agent, or Firm*—Melvin A. Hunn

[57] ABSTRACT

An apparatus for supporting modular and cooperating components which includes a base member, a vertical support pole extending upward from the base member, at least one bushing concentrically engaging the vertical support pole at a particular axial location, at least one support arm extending radially outward from the bushing, and at least one support surface secured to the support arms in a position substantially orthogonal to the support pole, which minimizes the space requirements for supporting modular and cooperating components, particularly in an office environment. The support apparatus according to the present invention increases the functionality of the modular and cooperating components without exposing the modular and cooperating components to unnecessary risk of harm.

29 Claims, 9 Drawing Sheets

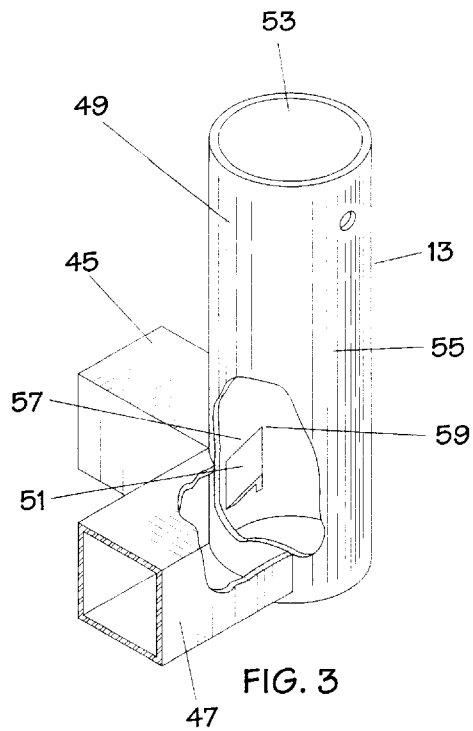
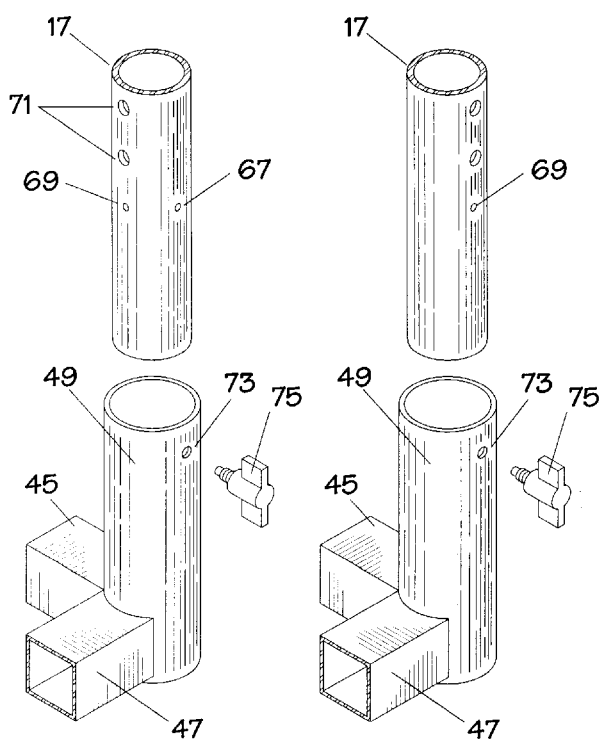

APPARATUS FOR SUPPORTING MODULAR AND COOPERATING COMPONENTS

This application is a continuation of Ser. No. 08/786,325 filed Jan. 23, 1997, now U.S. Pat. No. 5,746,334.

BACKGROUND OF THE INVENTION

1. Field of the Invention

The present invention relates in general to techniques for arranging and supporting modular, cooperating components such as, for example but not limitation, computing equipment, audio equipment, and video equipment.

2. Description of the Prior Art

Recent rapid advances in the computing industries have been driven largely by a reduction in the price of both processing power and computer memory. One result in the increased availability of inexpensive computing equipment is a tremendous increase in consumer demand for modular computing equipment, such as computers, computer displays, printers, and peripheral devices such as tape back-up devices and CD ROM devices. There appears to be an increased integration of computing equipment with traditional audio-visual entertainment devices, such as tuners, amplifiers, equalizers, video cassette recorders, laser discs, CD audio players, CD video players, and display screens of all types.

The computing equipment, audio equipment, and video equipment is still rather expensive and delicate, so conventional cabinet work is frequently utilized for supporting these modular components in the safest possible manner. However, the increased integration of computing equipment, audio equipment, and video equipment necessarily requires increased electrical connectivity between such devices, and it is not uncommon for an operator to frequently reconfigure devices to accomplish a particular short-term goal with such modular equipment. Traditional equipment supporting furniture does not allow easy access to all sides of the modular equipment, in particular the back portions of the modular equipment, and thus frustrates operator-initiated attempts to reconfigure the modular components for a particular purpose. However, since the modular components are still relatively expensive, exposing them to unnecessary risk of damage is generally not considered to be an acceptable risk when compared to the temporal needs of a particular operator.

A need exists for a support apparatus for utilization with modular cooperating components, such as computing equipment, audio equipment, and video equipment, which enhances the overall coordinated functionality of these components without unnecessarily exposing the modular components to risk of damage.

SUMMARY OF THE INVENTION

It is one objective of the present invention to provide an apparatus for supporting modular and cooperating components which includes a base member, a vertical support pole extending upward from the base member, at least one bushing concentrically engaging the vertical support pole at a particular axial location, at least one support arm extending radially outward from the bushing, and at least one support surface secured to the support arms in a position substantially orthogonal to the support pole, which minimizes the space requirements for supporting modular and cooperating components, particularly in an office environment. The support apparatus according to the present invention increases the functionality of the modular and cooperating components without exposing the modular and cooperating components to unnecessary risk of harm.

More particularly, the present invention is directed to an apparatus for supporting modular and cooperating components. The apparatus includes a base member which engages a flooring surface. In the preferred embodiment of the present invention, this base member includes a sleeve member, and a plurality of leg members secured to the sleeve member for engaging the flooring surface and maintaining the sleeve member in a substantially vertical position. Preferably, the plurality of leg members of the base member are disposed orthogonally to one another. A plurality of optional leg member configurations are provided in accordance with the present invention. In one configuration, two leg members are provided and are angularly spaced apart approximately 90°. This configuration is particularly useful for placement of the support apparatus of the present invention in or about workspace corners, such as corners provided in modular office cubicles, or the corners provided by office equipment such as desks. In another configuration, three leg members are provided over a range of approximately 180°, with each leg angularly spaced approximately 90° from the adjacent leg. In this configuration, the support apparatus of the present invention can be positioned in office spaces which are defined by a wall or other linear constraint. This configuration is particularly useful for placement of the modular and cooperating components in a central location relative to a workspace such as a desk. In a third configuration, the plurality of leg members are spaced angularly equidistant about a 360° area. In this configuration, the support apparatus of the present invention can be placed in "open" office spaces, since support is provided in all directions.

In accordance with the present invention, the base member further includes a fastener seat which is secured to an inner surface of the sleeve member. The fastener seat is adapted for engaging a substantially vertical support pole and maintaining it in a substantially fixed position relative to the base member. More particularly, in the preferred embodiment of the present invention, the fastener seat includes at least one inclined seating surface which engages a lowermost portion of the substantially vertical support pole, and which allows the weight of the substantially vertical support pole to urge portions of the vertical support pole into fixed engagement with a portion of the inner surface of the sleeve member. Still more particularly, the seat member includes an apex portion which is maintained in a distal position relative to the inner surface. The fastener seat further includes a plurality of downwardly sloping edges which extend from the apex to the inner surface. During assembly and operation, gravity biases the substantially vertical support pole both downwardly and inwardly along the downwardly sloping edges until the vertical support pole comes into contact with the inner surface. In the preferred embodiment of the present invention, the fastener seat operates to fix the position of the substantially vertical support pole in position relative to the base member in five out of six degrees of freedom. The substantially vertical support pole can still be rotated relative to the base member. A locking key is provided to engage the substantially vertical support pole and prevent rotation relative to the base member. More particularly, at least one latching cavity is provided on the exterior surface of the vertical support pole. The sleeve member of the base member includes at least one key-feed port extending therethrough, which can be aligned with the at least one latching cavity of the vertical support pole. A portion of the locking key is passed through a particular key-feed port and engages a particular one of the latching cavities. In the preferred embodiment of the present invention, the locking key includes an externally threaded portion which engages an internally threaded portion of the key-feed port, thus securing the locking key in position relative to the base member.

The preferred embodiment of the support apparatus of the present invention further includes at least one bushing, which concentrically engages the substantially vertical support pole at a particular axial location. Preferably, a plurality of bushings are provided, each disposed at a particular axial location relative to the substantially vertical support pole. Each bushing is rotatable relative to the vertical support pole, but preferably over a predetermined rotation range. In the preferred embodiment of the present invention, the rotation range allowed by a particular bushing matches the particular base configuration. For a base configuration which includes two legs which provide support over a 90° range, the modular and cooperating components should be maintained intermediate the legs to maximize stability. For a three leg configuration, where the legs span a range of 180°, it is acceptable to allow the modular and cooperating components to be arranged in any rotational orientation over the 180° range. Finally, for a base configuration with four or more legs, which provide support over a range of 360°, any angular orientation is allowed.

Preferably, each bushing includes a hub portion which includes a central bore for concentrically receiving the vertical support pole, a hub pin for maintaining the hub portion in a fixed axial position relative to the vertical support pole, and a bushing insert which is carried within the hub portion, and which includes a particular contoured portion which defines the range of rotation of the particular bushing relative to the base member. More particularly, the bushing insert is adapted to be positioned within the hub portion in a particular orientation. The lowermost portion of the bushing insert extends outwardly of the bushing, and is contoured to provide a surface which slidably engages the hub pin over the predetermined range of rotation. Typically, the region which slidably engages the hub pin is defined by stop members. This contoured configuration is typically referred to as "castellation".

In the preferred embodiment of the present invention, the hub pin includes an eyelet portion which is adapted for receiving and securing conductors which extend between the modular and cooperating components. The hub pin also includes a load bearing portion (preferably the shaft portion of an eye-bolt) for engaging the lowermost portion of the hub, and in particular the bushing insert. The hub pin and hub portion engagement serves two functions simultaneously. First, it prevents downward axial displacement of the bushing. Second, it limits the range of rotation depending upon the particular configuration of the base member, as was discussed above. The hub pin thus simultaneously serves three important functions in the present invention.

In the preferred embodiment of the present invention, a plurality of bushing station ports are provided which extend through the vertical support pole, and which define a plurality of possible axial positions for engagement of bushings. In accordance with the present invention, the orientation of the bushing station ports corresponds to the particular base member provided. In other words, bushing station ports are provided at particular positions which ensure that the modular and cooperating components are maintained within the range of support provided by the particular leg configuration of the base member.

In the preferred embodiment of the present invention, the hub pin is externally threaded at the end opposite the eye portion. A hub pin retainer member is provided, which includes an internally threaded portion, which couples to the hub pin and prevents inadvertent removal of the hub pin.

The support apparatus of the present invention further includes at least one support surface, each of which is secured to a corresponding cantilevered support arm which extends radially outward from a particular bushing. Preferably, the support arms are orthogonal to the substantially vertical support pole. Loads are applied normal to the support surface and associated support arm. Preferably, the support surfaces are positioned substantially orthogonal to the support pole and are adapted for receiving and supporting the modular and cooperating component's particular axial and angular positions relative to the base member and the substantially vertical support pole In the preferred embodiment of the present invention, each particular support surface is pivotally coupled to a selected support arm. Preferably, this support surface comprises a single piece of relatively low profile but sturdy material, such as an aluminum sheet. The pivotal coupling between the support surface and the support arm preferably comprises a coupling bore which extends through the support surface at a central location, and a coupling pin which extends to the coupling bore and which serves to secure the support surface to the support arm. This coupling allows for full 360° rotation of the support surface, to allow any orientation of the modular components that is required by the operator. In the preferred embodiment of the present invention, a locking member is provided for fixing the rotational orientation of the support surface relative to the support arm. Additionally, male and female mating members are provided between the support surface and the support arm for slightly impeding rotational movement, and especially for impeding vibration-induced rotational movement, which is frequently present during the operation of such components as impact printers.

Additional objectives, features and advantages of the present invention will be apparent with reference to the detailed description which follows.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 is a detail and cut-away view of the base portion of the support apparatus which is depicted in FIG. 1;

FIGS. 4a and 4b are fragmentary detail views of a portion of the support apparatus depicted in FIG. 1, depicting a base portion and interconnecting support pole;

DETAILED DESCRIPTION OF THE INVENTION

Figure 1:
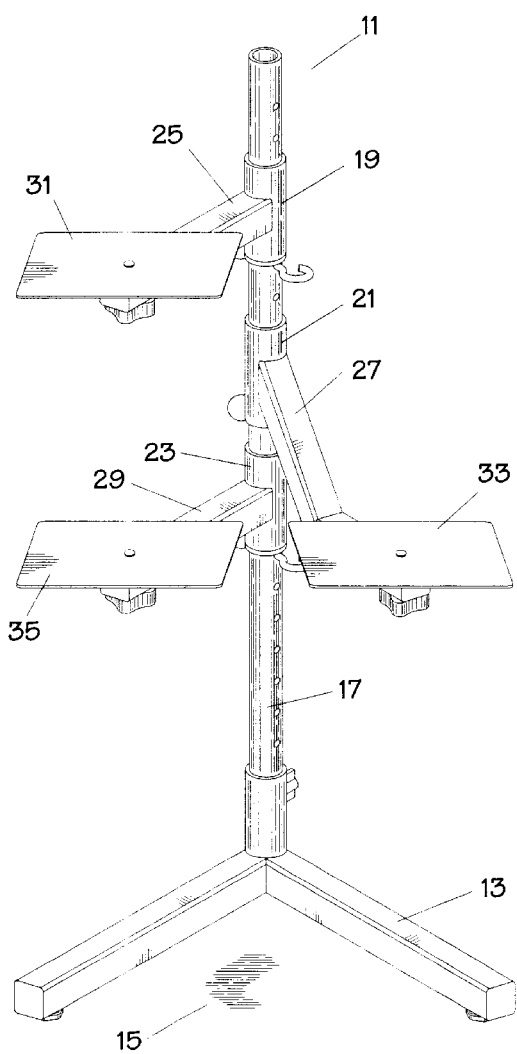
FIG. 1 is a perspective view of one embodiment of the support apparatus of the present invention.

FIG. 1 is a perspective view of one embodiment of support apparatus 11 of the present invention. As is depicted therein, support apparatus 11 includes base member 13 which is adapted for engaging a flooring surface 15 and a substantially vertical support pole 17. A plurality of bushings 19, 21, 23, each concentrically engage vertical support pole 17 at a particular axial location. A plurality of support arms 25, 27, 29 extend radially outward from bushings 19, 21, 23 at particular orientations relative to one another, and a plurality of support surfaces 31, 33, 35 are secured to the support arms 25, 27, 29, respectively, and are positioned substantially orthogonal to the vertical support pole and adapted for receiving and supporting modular and cooperating components at particular axial and angular positions relative to base member 13 and vertical support pole 17.

Figure 2:
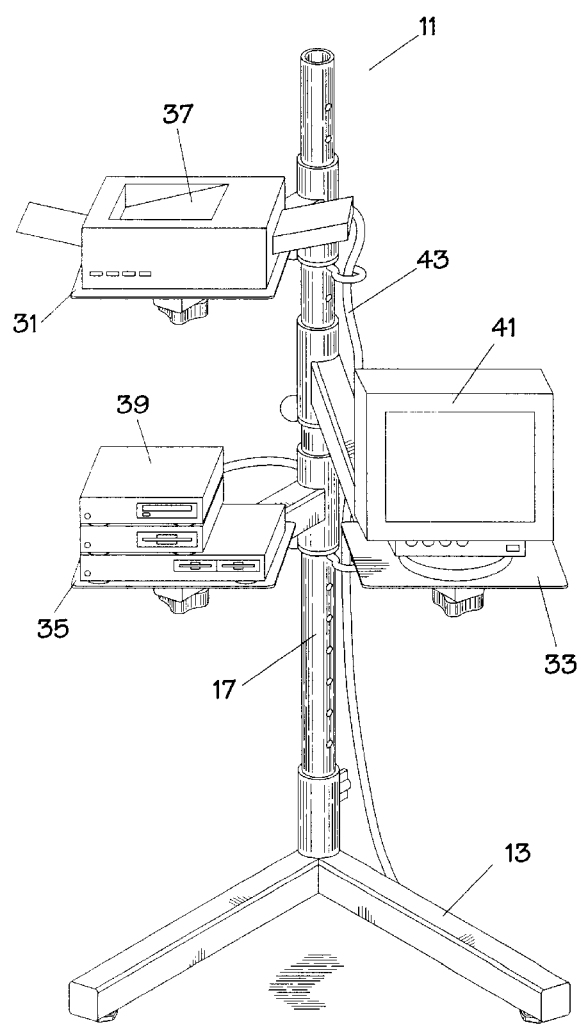
FIG. 2 depicts the support apparatus of FIG. 1, supporting modular computing equipment.

FIG. 2 depicts support apparatus 11 of FIG. 1, supporting modular computing equipment. As is shown, printer 37 is disposed on support surface 31 at a particular axial and angular position relative to base member 13 and vertical support pole 17. Central processing unit and associated mass memories 39 are supported by support surface 35 in a particular and angular position relative to base member 13 and vertical support pole 17. Monitor 41 is supported by support surface 33 at a particular axial and angular position relative to base member 13 and vertical support pole 17. Cabling 43 extends between the modular and cooperating components which make up the data processing system depicted in FIG. 2. The present invention is not intended to be limited for utilization in supporting components of a data processing system, and is intended to support all types of modular and cooperating components, including audio components and video components. The present invention may be utilized to support a combination of computing, audio, and video components in a particular location, with sub-groupings of these components comprising cooperating components, and with not all of the components cooperating together.

FIG. 3 is a detail and cut-away view of base member 13 of FIGS. 1 and 2. As is shown, base member 13 includes sleeve member 49 and a plurality of leg members 45, 47 which are secured to sleeve member 49 and adapted for engaging flooring surface 15 (in FIG. 1) and maintaining sleeve member 49 in a vertical position. In the embodiment of FIG. 3, leg members 45, 47 are disposed orthogonally relative to one another. In this configuration, support apparatus 11 is adapted to maintain the modular and cooperating components within the 90° region spanned by leg members 45, 47. In alternative embodiments which will be discussed below, alternative arrangements are discussed for providing a broader region for placement of the modular and cooperating components.

In FIG. 3, fastener seat 51 is also depicted. As is shown, the sleeve member 49 defines an interior cylindrical surface 53 and an exterior cylindrical surface 55. The fastener seat is secured to the interior cylindrical surface 53 and is adapted for engaging vertical support pole 17 and substantially fixing its position relative to base member 13. More particularly, fastener seat 51 includes at least one incline seating surface 57 which engages a lowermost portion of vertical support pole 17, and which allows the weight of vertical support pole 17 to urge it into substantially fixed engagement with a portion of interior cylindrical surface 53 of sleeve member 49. In the preferred embodiment of the present invention, fastener seat 51 includes apex portion 59 which is disposed in a distal position relative to interior cylindrical surface 53, and further includes a plurality of downwardly sloping edges which extend from apex 59 to interior cylindrical surface 53. During assembly operation, gravity biases support pole 17 downwardly and inwardly along the plurality of downwardly sloping edges until vertical support pole 17 contacts interior cylindrical surface 53. In this particular embodiment, fastener seat 51 substantially fixes the position of vertical support pole 17 in five out of the six degrees of freedom. Only freedom to rotate relative to fastener seat 51 remains.

Figure 5:
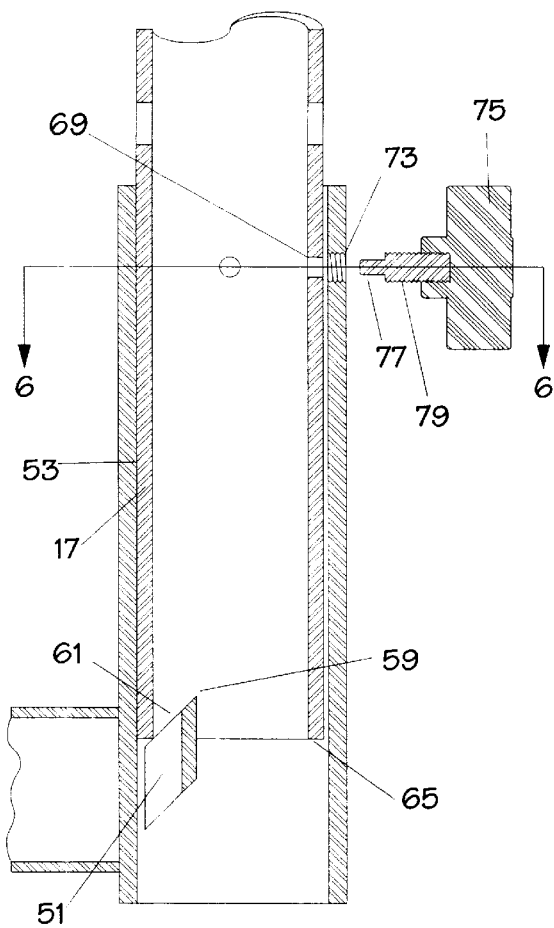
FIG. 5 is a longitudinal section view of the base portion of the support apparatus which is depicted in FIGS. 3, 4a, 4b, and 6, as seen along section line B—B of FIG. 6.
Figure 6:
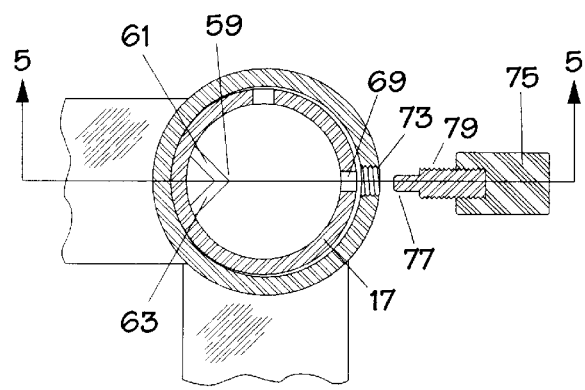
FIG. 6 is a cross-section view of the base portion of the support apparatus which is depicted in FIGS. 3, 4a, 4b, and 5, as seen along section A—A of FIG. 5.

FIG. 5 provides a section view of the base member 13 of support apparatus 11 which is depicted in FIGS. 3, 4a, 4b, and 6 as seen along section line B—B of FIG. 6. FIG. 6 is a cross-section view of base member 13 of support apparatus 11 which is depicted in FIGS. 3, 4a, 4b, and 5, as seen along section line A—A of FIG. 5. As is shown in these figures, apex portion 59 is disposed a substantial distance away from interior cylindrical surface 53. Fastener seat 51 includes downwardly sloping edges 61, 63 which extend from apex portion 59 to interior cylindrical surface 53. During assembly, vertical support pole 17 is placed within the bore defined by interior cylindrical surface 53, and lowered in position relative to fastener seat 51. The lowermost portion 65 of vertical support pole 17 engages downwardly sloping edges 61, 63, and is urged into contact with interior cylindrical surface 53. Note in both FIGS. 5 and 6 that a substantial clearance exists between vertical support pole 17 and interior cylindrical surface 53. Nevertheless, fastener seat 51 is sufficient to fix the position of vertical support pole 17 in five out of six degrees of freedom, with the sole remaining degree of freedom comprising rotation of vertical support pole 17 relative to base member 13.

In order to prevent rotation of vertical support pole 17, and to ensure proper alignment of vertical support pole 17 relative to base member 13, another fastening mechanism is provided, which will be explained with reference to FIGS. 4a, 4b, 5, and 6. As is shown in these figures, latching cavities 67, 69 are provided in the exterior surface of vertical support member 17 at particular angular orientations relative to support holes 71 which are utilized to secure bushings in position relative to vertical support pole 17 (and which will be discussed in detail further below). As is shown best in FIGS. 4a and 4b, latching cavity 69 is disposed directly beneath support holes 71, while latching cavity 67 is disposed 90° away from latching cavity 69. These particular orientations ensure that the modular and cooperating components which are to be supported by support apparatus 11 are maintained within the 90° region which is spanned by leg members 45, 47 of base member 13.

Also, as is shown in these figures, sleeve member 49 includes key-feed port 73 which extends therethrough, and which is adapted with internal threads for coupling with external threads on a portion of locking key 75 which is adapted to engage either latching cavity 67 or latching cavity 69, depending upon the operator selection of the particular orientation. As is shown in these figures, locking key 75 includes an unthreaded tip portion 77 which is appropriately sized to fully engage and mate with latching cavities 67, 69. The larger-diameter exteriorly threaded portion 79 is adapted in size to mate with the internal threads on key-feed port 73.

Figure 7A:
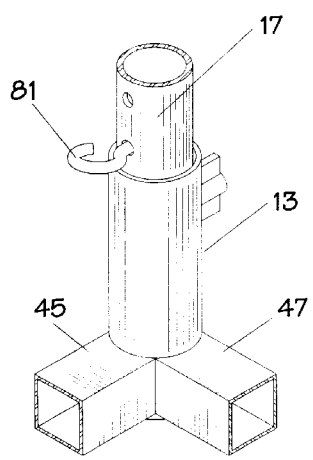
FIGS. 7a, 7b, 7c, 8a, 8b, 9a, and 9b depict alternative base members for use in the support apparatus of the present invention.
Figure 7B:
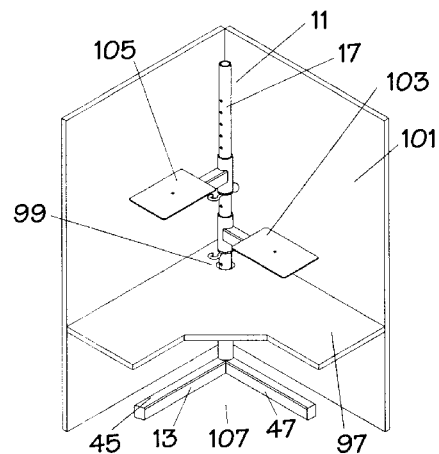
Figure 7C:
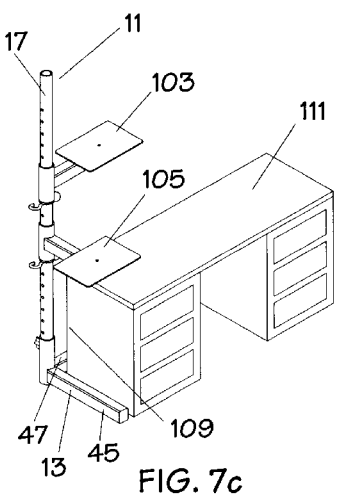

FIGS. 7a, 7b, 7c, 8a, 8b, 9a, and 9b depict alternative base member 13 configurations which provide different acceptable ranges of rotation for the angular and axial placement of the modular and cooperating components, and illustrate, in simplified form, the relationship between a pin 81, which is utilized to secure a bushing in position relative to vertical support pole 17 and base member 13. FIGS. 7a, 7b, and 7c depict one embodiment of base member 13 which includes leg members 45, 47, which are disposed over a range of approximately 90°, and which is especially useful in positioning the modular and cooperating components in or about a corner, such as that depicted in FIGS. 7b and 7c. In FIG. 7b, support apparatus 11 is depicted in a position within a corner of modular office furniture, which is typically identified as office "cubicles". As is shown, vertical support pole 17 extends through circular port 99 in work table 97 which is oriented within a corner of cubicle 101. As is shown, leg members 45, 47 of base member 13 are oriented in alignment with the orthogonal components of cubicle 101. Also note that support platforms 103, 105 are disposed in angular positions within the 90° range spanned by leg members 45, 47. In this configuration, the load of the modular and cooperating components which are placed upon support surfaces 103, 105 exert thrust and bending forces upon vertical support member 17, which transfers the load through sleeve member 49 and leg members 45, 47 to flooring 107. FIG. 7c depicts support apparatus 11 positioned to straddle corner 109 of desk 111 in a manner which orients support surfaces 103, 105 in useful positions relative to desk 111, but within the 90° range spanned by leg members 45, 47.

Figure 8A:
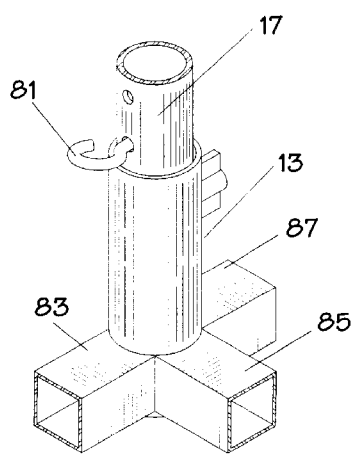
Figure 8B:
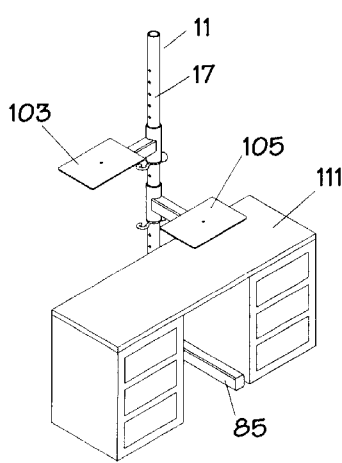

FIGS. 8a and 8b depict an alternative base member 13 configuration which utilizes three leg members 83, 85, 87 which span a 180° range, and thus which provide a broader region for the angular placement of the modular and cooperating components which are suspended from vertical support pole 17. Since this configuration provides a 180° range of angular placement of the modular and cooperating components, it is particularly useful in alignment of the modular and cooperating components along a linear office component, such as an office wall, or intermediate office equipment, such as desk 111 and an office wall, which is depicted in FIG. 8b. As is shown, leg 85 extends forward into the leg space provided within desk 111. Support surfaces 103, 105 are conveniently located in positions relative to desk 111, and can be rotated through the full 180° range of available positions, as required by the workers immediate needs.

Figure 9A:
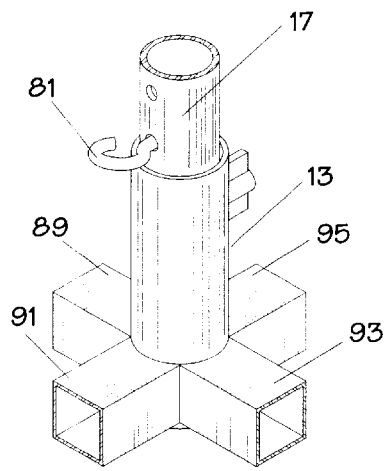
Figure 9B:
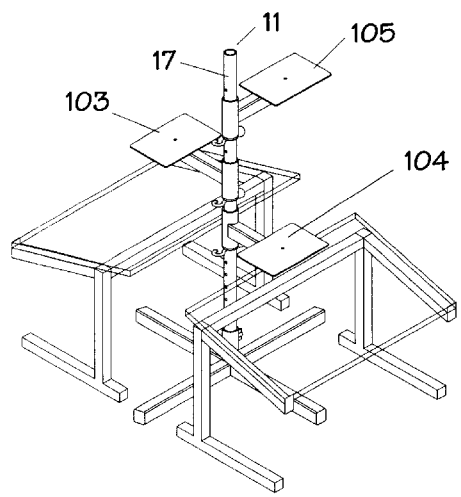

FIGS. 9a and 9b depict yet another alternative configuration for base member 13 which includes leg members 89, 91, 93, and 95, thus providing a full 360° of rotation freedom for the modular and cooperating components which are carried by support apparatus 11. This orientation is particularly useful in open areas such as that depicted in FIG. 9b, where one may desire to rotate the particular modular and cooperating components about fully, such as may be required in the drafting table configuration depicted in FIG. 9b. As is shown, support surfaces 103, 104, 105 may be rotated to allow one or more individuals access to the particular modular components during particular drafting operations.

Figure 12:
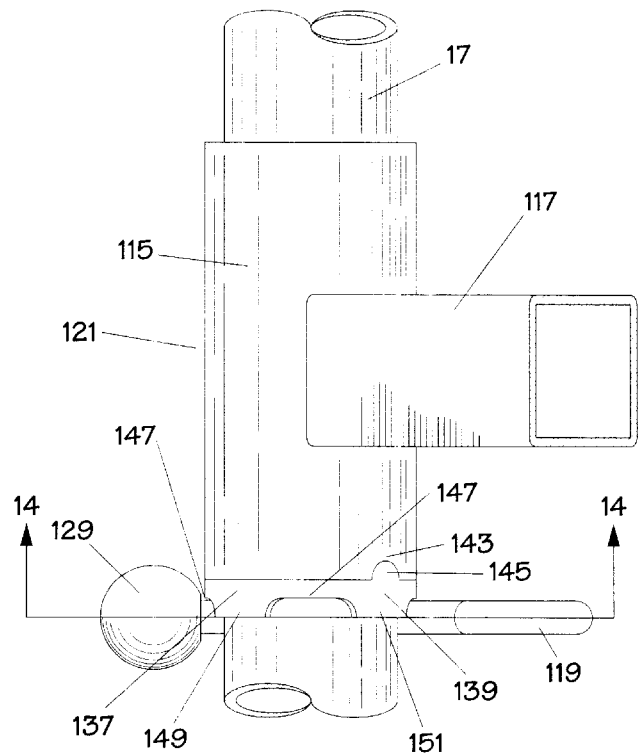
FIG. 12 is a perspective and fragmentary view of the support bushing, support arm, and support pole which are depicted in FIG. 11.
Figure 13:
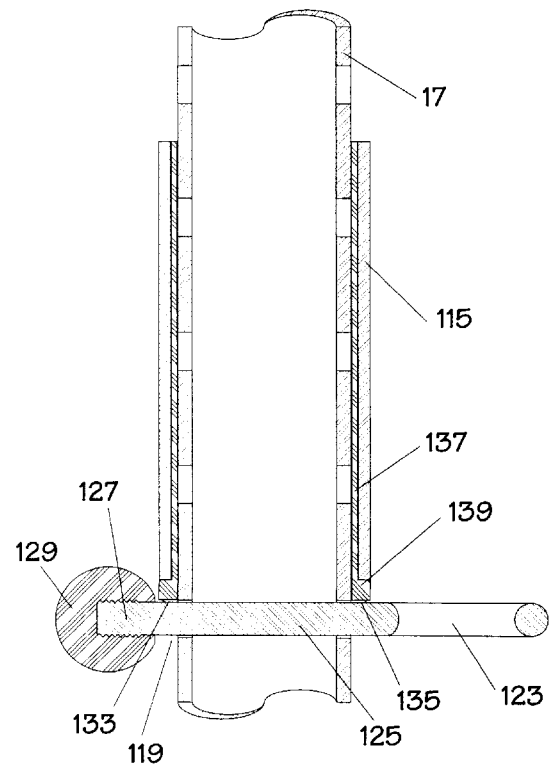
FIG. 13 is a longitudinal section view of the support bushing and support pole as seen along section line C—C of FIG. 11.
Figure 17A:
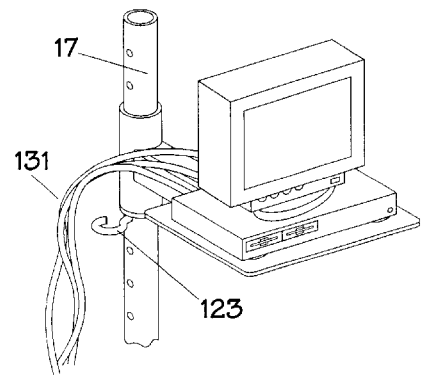
FIGS. 17a, 17b, and 17c depict the utilization of an eye bolt fastener to secure electrical cables which run between the various modular components of the computing equipment.
Figure 17B:
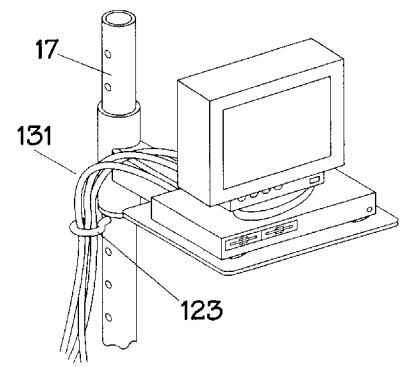

While the particular orientation of the latching cavities and the key-feed port determine the angular orientation of vertical support pole 17 relative to base member 13, the rotational freedom of the modular and cooperating components supported by the various support surfaces determined by the functional components of the bushing members which circumferentially engage vertical support pole 17 at particular axial locations, as will now be described with particular reference to FIGS. 10, 11, 12, and 13. As is shown in these figures, bushing 121 includes hub portion 115 which includes a central cylindrical bore 114 which is adapted to receive vertical support pole 17. As is shown in these figures, hub portion 115 is secured to support arm 117 which extends radially outward therefrom. Bushing 121 further includes hub pin 119 which includes an eyelet portion 123, a load bearing portion 125, and an externally threaded fastening portion which is adapted to mate with an internally threaded hub pin retainer member 129 which prevents the inadvertent or accidental removal of hub pin 119 from vertical support pole 17. As is best depicted in FIGS. 17a and 17b, eyelet portion 123 of hub pin 121 is utilized to secure conductors which extend between the various modular and cooperating components in a secure position relative to vertical support pole 17. Returning now to FIG. 13, load-bearing portion 125 of hub pin 119 is utilized to maintain hub portion 115 in a fixed axial position relative to vertical support pole 17. Also, as is best depicted in FIG. 13, externally threaded fastening portion of hub pin 119 engages hub pin retainer member 129 to prevent hub pin 119 from being inadvertently removed from vertical support pole 17. As is best depicted in FIG. 13, a plurality of axially positioning holes, such as holes 133, 135 of FIG. 13 are adapted in size to receive load bearing portion 125 of hub pin 119. In this configuration, hub portion 115 bears down upon load bearing portion 125 of hub pin 119.

Figure 10:
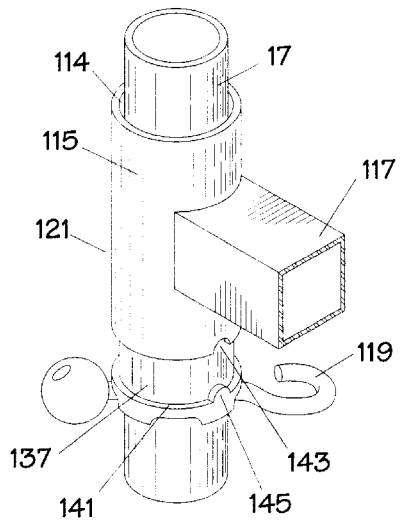
FIG. 10 is a depiction of the castellation the support bushing of FIGS. 11, 12, and 13, which define the range of rotation of the support arm.
Figure 11:
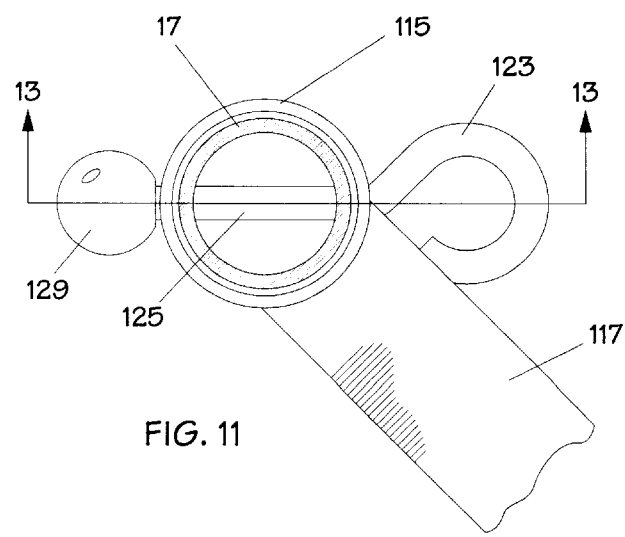
FIG. 11 is a detail view of an arm bushing which couples a support arm to the support pole in the support apparatus depicted in FIG. 1, seen in cross-section.

In the preferred embodiment of the present invention, bushing 121 further includes a bushing insert 137 which is preferably formed of plastic, and which includes a radially reduced portion 139 which is adapted to slide inward of hub portion 115 and be disposed in the space between vertical support pole 17 and interior cylindrical surface 114 of hub 115, and radially enlarged and contoured lower portion 141. A female mating notch 143 is provided on the lower lip of hub portion 115, while a male mating notch 145 is provided on the radially-enlarged contoured portion of bushing insert 137. When these male and female mating portions are aligned, bushing insert 141 is in its proper alignment relative to hub portion 115. In FIG. 10, bushing insert 137 is depicted slightly retracted from the interior cylindrical bore 114 of hub portion 115 of bushing 121; however, in the view of FIG. 12, the male and female portions are depicted as mating, thus indicating a proper orientation of bushing insert 131 relative to hub portion 115. As is best shown in FIG. 12, radially-enlarged contoured portion 139 of bushing insert 137 includes a range limiting portion 147 for slidably engaging hub pin 119 over a preselected acceptable range of rotation, with the range limiting portion being defined between stop members, such as stop members 149, 151 of FIG. 12 which prevent further rotation of bushing 121.

Figure 14A:
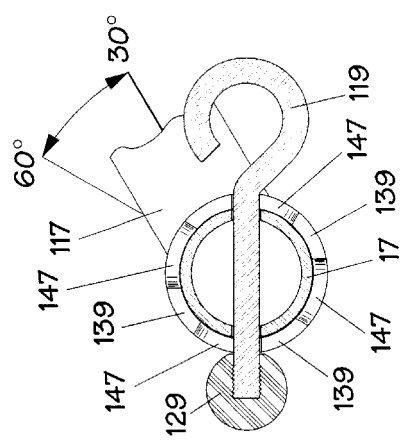
FIGS. 14a, 14b, and 14c depict the utilization of the castellation of the support bushing to provide a restricted range of movement of the associated support arm.
Figure 14B:
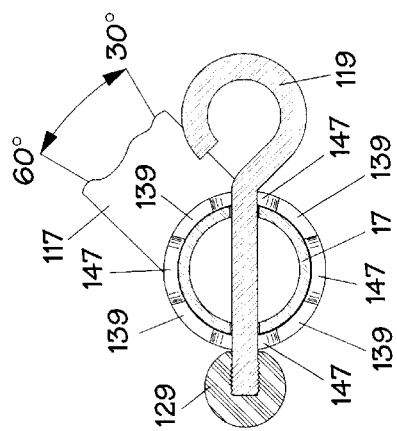
Figure 14C:
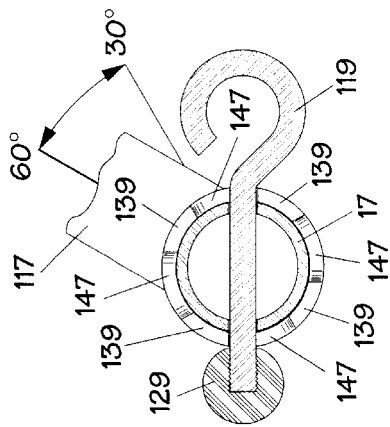

The one possible configurations are best depicted in the views of FIGS. 14a, 14b, 14c, 15a, 15b, and 16. The views of FIGS. 14a, 14b, 14c, depict hub pin 119 cooperating with castellations or range limiting portions 147 in lower enlarged portion 139 of bushing insert 137. FIGS. 14a through 14c illustrate range limiting portions 147 arranged to provide a 30° range of motion. FIG. 14a illustrates support arm 117 at a 30° orientation relative to vertical support pole 17. In this 30° position, hub pin 119 abuts the end walls of range limiting portions 147 in lower portion 139 of bushing insert 137. FIG. 14b illustrates support arm 117 in an intermediate position in which hub pin 119 is intermediate the end walls of range limiting portion 147. FIG. 14c illustrates support arm 117 in a 60° position in which hub pin 119 abuts the end walls of range limiting portions 147 opposite from those abutted in the 30° position illustrated in FIG. 14a. Thus, FIGS. 14a through 14c illustrate a pattern of crenellations or range limiting portions 147 that restrict movement of support arm 117 to a 30° range of motion.

Figure 15B:
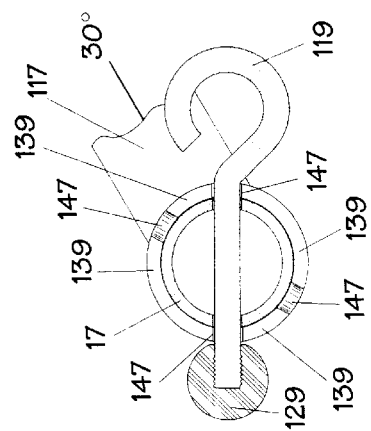
FIGS. 15a and 15b depict another utilization of the castellation of the support bushing to provide at least a pair of fixed positions of the associated support arm.
Figure 15A:
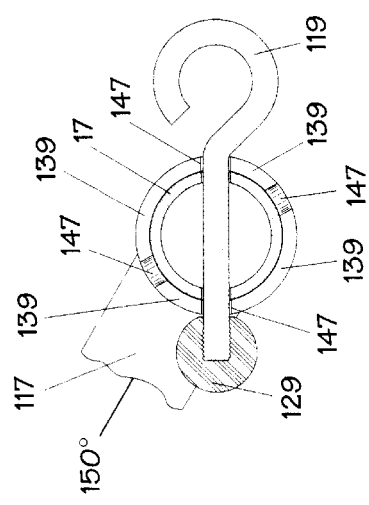

FIGS. 15a and 15b represent an embodiment of the present invention in which lower end 139 of bushing insert 137 is provided with two pairs of crenellations or range limiting portions 147 that are dimensioned to be coextensive with the diameter of hub pin 119. Thus, two fixed positions of support arm 117, a 150° position and a 30° position are selectable, depending on which pair of range limiting portions 147 engage hub pin 119. In this arrangement, support arm 117 is not freely movable but occupies one of two fixed positions defined by range limiting portions 147. Of course, any number of fixed positions may be selected, limited only by the ability to provide lower end 139 of bushing insert 137 with range limiting portions 147.

Figure 16:
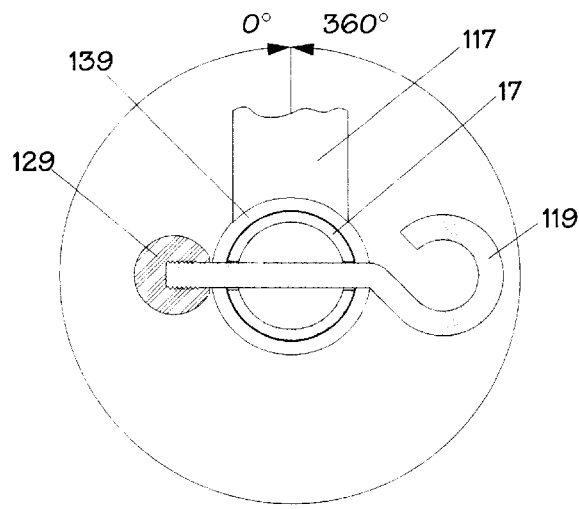
FIG. 16 depicts the utilization of no castellation on the support bushing to provide an unlimited range of movement of the associated support arm.

FIG. 16 depicts an arrangement in which lower end 139 of bushing insert 137 is smooth and provided with no range limiting portions. Thus, the arrangement illustrated in FIG. 16 provides for unrestricted movement of support arm 117 a full 360° around vertical support member 17. In this arrangement, hub pin 119 serves only to maintain bushing 121 in a selected axial or vertical position relative to vertical support member 17.

FIGS. 14a through 16 illustrate various arrangements in which movement of support arm 117 about vertical support member 17. In the preferred embodiment of the present invention, the range of motion of support arm 117 should be restricted to equal to or less than the included angle between the legs of base member 13 to prevent tipping of the support apparatus due to unbalanced loads. In the case of the two leg embodiment of FIGS. 7a, 7b and 7c, the range of motion would be restricted to equal to or less than 90°. In the three leg embodiment of FIGS. 8a and 8b, the range of motion should be restricted to 180°. In the four leg embodiment illustrated in FIGS. 9a and 9b, the range of motion need not be restricted at all.

Figure 17C:
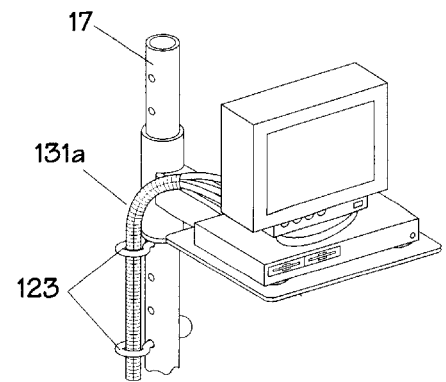

FIGS. 17a, 17b, and 17c illustrate the utility of eye portion 123 of hub pin 119 in securing cables 131, cords, and the like of equipment supported by the apparatus according to the present invention. As shown in FIG. 17b, cords 131 can be secured within eye portion 123 of support hub pin 119 to prevent tangling and catching of cables 131 on other equipment or the apparatus itself. FIG. 17c illustrates an alternative arrangement in which the cords are first bundled utilizing a sheathing member 131a prior to securing the cables in the hook portions of hub pins 119.

Figure 18:
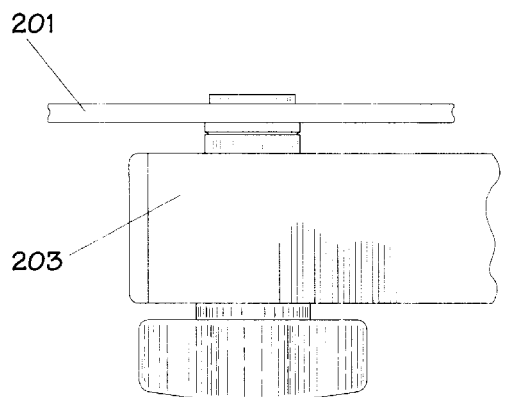
FIG. 18 is a detail view of a portion of FIG. 1, depicting a coupling of a support arm and a support shelf of the support apparatus.
Figure 19:
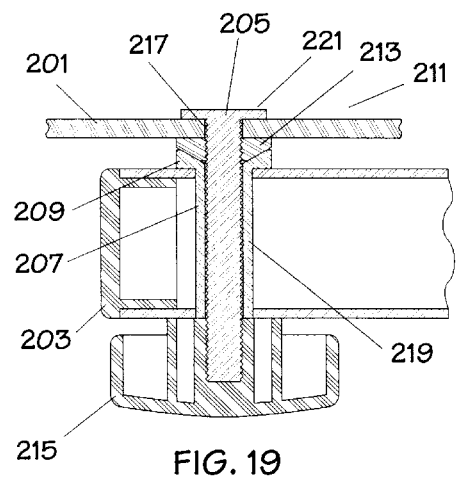
FIG. 19 is a cross-section view of the detail view of FIG. 18 of FIG. 20.
Figure 20:
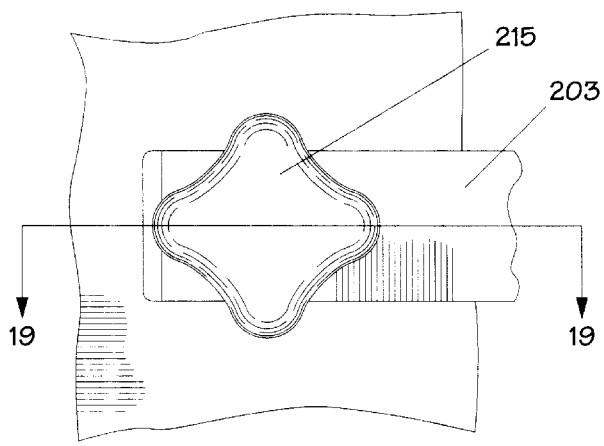
FIG. 20 is a view from the bottom of the detail view of FIG. 18.

FIGS. 18, 19, and 20 depict support surface 201, support arm 203, and pivotal coupling 211 which includes externally threaded bolt 205, internally threaded sleeve 207 with beveled seating head 209, beveled seating washer 213, and locking member 215. A coupling bore 217 is provided in a central location in support surface 201. In the preferred embodiment of the present invention, support surface 201 comprises a low profile sturdy material, such as an aluminum plate. Internally threaded sleeve 207 is placed into bore 219 of support arm 203. Externally threaded bolt 205 serves as a coupling pin for securing support surface 201 to support arm 203 in a manner which allows 360° of rotation for support surface 201 relative to support arm 203. Locking member 205 is provided with a knob component and an internally threaded bore for engaging externally threaded bolt 205 and fixing the position of support surface 201 relative to support arm 203. Locking member 215 may be loosened or tightened depending upon the operator's desires for repositioning of the modular component supported by support surface 201. Since only a very unobtrusive bolt head 221 of externally threaded bolt 205 extends outward from support surface 201, the coupling mechanism 211 does not interfere with, or impede the operation of, the modular and cooperating component which is carried and supported by support surface 201. Since coupling bore 217 is disposed in a central location within support surface 201, an advantageous load bearing configuration is obtained so that pure bending forces are applied through support surface 201 to support arm 203 through a region of support surface 201 which substantially coincides with the center of gravity of the modular and cooperating component which is carried by support surface 201.

The male and female mating members defined by beveled head 209 and beveled washer 213 provide a means for slightly impeding the rotational movement of support surface 201 relative to support arm 203, which is especially useful in impeding vibration-induced rotational movement of support surface 201 relative to support arm 203 in response to highly kinetic equipment, such as impact printers. This male and female mating configuration allows for infinite rotational adjustability without presenting rotational instability.

Figure 21:
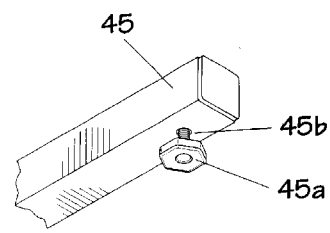
FIG. 21 is a fragmentary perspective view of a leveler utilized on the legs of the support apparatus according to the present invention.

FIG. 21 is a fragmentary section view illustrating a leveler for use with the legs (45, 47, 83, 85, 87, 89, 91, 93, and 95 in FIGS. 7a through 9b) to permit leveling of the support apparatus according to the present invention. Leveler 45a consists of a footed attachment which is secured by a threaded portion 45b to leg 45. By rotating foot 45a, its protrusion from bottom of leg 45 can be varied permitting leveling of the support apparatus according to the present invention. Each of the legs of the support apparatus according to the present invention preferably is provided with a leveler as illustrated in FIG. 21.

While the invention has been shown in only one of its forms, it is not thus limited but is susceptible to various changes and modifications without departing from the spirit thereof.

What is claimed is:

1. An apparatus for supporting modular and cooperating components having a mass, comprising:

a base member including a plurality of discrete and orthogonally positioned leg members for engaging a flooring surface;

a substantially vertical support pole extending upward from said base member and releasably coupled thereto;

at least one bushing, concentrically engaging said substantially vertical support pole at a particular axial location;

at least one support arm, extending radially outward from said at least one bushing at a particular orientation;

at least one support surface, secured to said at least one support arm, said at least one support surface being positioned substantially orthogonal to said substantially vertical support pole and adapted for receiving and supporting said modular and cooperating components at particular axial and angular positions relative to said base member and said substantially vertical support pole;

locator means for (a) substantially fixing automatically during assembly through gravity bias said substantially vertical support pole in position relative to said base member in five out of six degrees of freedom, and (b) allowing movement automatically after assembly of said at least one support arm and associated at least one support surface to a predefined range of movement relative to said at least one bushing in order to locate said mass of said modular and cooperating components to a particular range of stable positions defined by said discrete and orthogonally positioned plurality of leg members of said base member;

wherein said base member includes (a) a sleeve member, and (b) a plurality of leg members secured to said sleeve member for engaging said flooring surface and maintaining said sleeve member in a vertical position;

wherein said substantially vertical support pole includes at least one latching cavity therein;

wherein said sleeve member of said base member includes at least one key-feed port extending therethrough;

said apparatus for supporting modular and cooperating components further comprising:

a locking key which passes through said at least one key-feed port and engages said at least one latching cavity, when said at least one key-feed port and said at least one latching cavity are aligned.

2. An apparatus for supporting modular and cooperating components, according to claim 1:

wherein said at least one key-feed port includes an internally threaded portion; and wherein said locking key includes an externally threaded portion for engaging said internally threaded portion of said at least one key-feed port.

3. An apparatus for supporting modular and cooperating components, according to claim 2:

wherein said locking key includes a knob portion which is utilized during installation to engage said particular one of said at least one latching cavity with said locking key.

4. An apparatus for supporting modular and cooperating components, according to claim 1:

wherein engagement of said particular one of said at least one latching cavity with said locking key restricts rotation of said substantially vertical support pole relative to said base member.

5. An apparatus for supporting modular and cooperating components having a mass, comprising:

a base member including a plurality of discrete and orthogonally positioned leg members for engaging a flooring surface;

a substantially vertical support pole extending upward from said base member and releasably coupled thereto;

at least one bushing, concentrically engaging said substantially vertical support pole at a particular axial location;

at least one support arm, extending radially outward from said at least one bushing at a particular orientation;

at least one support surface, secured to said at least one support arm, said at least one support surface being positioned substantially orthogonal to said substantially vertical support pole and adapted for receiving and supporting said modular and cooperating components at particular axial and angular positions relative to said base member and said substantially vertical support pole;

wherein said base member includes (a) a sleeve member, and (b) a plurality of leg members secured to said sleeve member for engaging said flooring surface and maintaining said sleeve member in a vertical position;

wherein said sleeve member defines an inner surface and an outer surface;

wherein a fastener seat is secured to said inner surface of said sleeve member for engaging said support pole and fixing said substantially vertical support pole relative to said base member except for rotation;

wherein said substantially vertical support pole includes at least one latching cavity therein;

wherein said sleeve member of said base member includes at least one key-feed port extending therethrough;

said apparatus for supporting modular and cooperating components further comprising:

a locking key which passes through said at least one key-feed port and engages said at least one latching cavity, when said at least one key-feed port and said at least one latching cavity are aligned; and wherein engagement of said at least one latching cavity with said locking key limits rotation of said substantially vertical support pole relative to said base member.

6. An apparatus for supporting modular and cooperating components having a mass, comprising:

a base member including a plurality of discrete and orthogonally positioned leg members for engaging a flooring surface;

a substantially vertical support pole extending upward from said base member and releasably coupled thereto;

at least one bushing, concentrically engaging said substantially vertical support pole at a particular axial location;

at least one support arm, extending radially outward from said at least one bushing at a particular orientation;

at least one support surface, secured to said at least one support arm, said at least one support surface being positioned substantially orthogonal to said substantially vertical support pole and adapted for receiving and supporting said modular and cooperating components at particular axial and angular positions relative to said base member and said substantially vertical support pole;

a locking member for fixing said at least one support surface in rotational orientation relative to said at least one support arm.

7. An apparatus for supporting modular and cooperating components having a mass, comprising:

a base member including a plurality of discrete and orthogonally positioned leg members for engaging a flooring surface;

a substantially vertical support pole extending upward from said base member and releasably coupled thereto;

at least one bushing, concentrically engaging said substantially vertical support pole at a particular axial location;

at least one support arm, extending radially outward from said at least one bushing at a particular orientation;

at least one support surface, secured to said at least one support arm, said at least one support surface being positioned substantially orthogonal to said substantially vertical support pole and adapted for receiving and supporting said modular and cooperating components at particular axial and angular positions relative to said base member and said substantially vertical support pole;

wherein said locking member includes an internally threaded locking knob for engaging an externally threaded portion of said coupling pin.

8. An apparatus for supporting modular and cooperating components having a mass, comprising:

a base member including a plurality of discrete and orthogonally positioned leg members for engaging a flooring surface;

a substantially vertical support pole extending upward from said base member and releasably coupled thereto;

at least one bushing, concentrically engaging said substantially vertical support pole at a particular axial location;

at least one support arm, extending radially outward from said at least one bushing at a particular orientation;

at least one support surface, secured to said at least one support arm, said at least one support surface being positioned substantially orthogonal to said substantially vertical support pole and adapted for receiving and supporting said modular and cooperating components at particular axial and angular positions relative to said base member and said substantially vertical support pole;

male and female mating members coupled between said at least one support surface and said at least one support arm, for slightly impeding rotational movement and especially impeding vibration-induced rotational movement.

9. An apparatus for supporting modular and cooperating components, according to claim 1:

wherein each of said at least one support surface is pivotally coupled to a selected one of said at least one support arm.

10. An apparatus for supporting modular and cooperating components, according to claim 9:

wherein each of said at least one support surface comprises a single piece of a relatively low profile but sturdy material.

11. An apparatus for supporting modular and cooperating components, according to claim 9:

wherein a pivotal coupling between each of said at least one support surface and said selected one of said at least one support arm comprises:

a coupling bore extending through each of said at least one support surface at a central location;

a coupling pin extending through said coupling bore and securing each of said at least one support surface to said selected one of said at least one support arm;

wherein each of said at least one support surface is fully rotatable relative to said selected one of said at least one support arm.

12. An apparatus for supporting modular and cooperating components having a mass, comprising:

a substantially vertical support pole;

at least one bushing, concentrically engaging said substantially vertical support pole at a particular axial location;

at least one support arm, extending radially outward from said at least one bushing at a particular orientation; and at least one support surface, secured to said at least one support arm, said at least one support surface being positioned substantially orthogonal to said substantially vertical support pole and adapted for receiving and supporting said modular and cooperating components at particular axial and angular positions relative to said base member and said substantially vertical support pole;

locator means for (a) substantially fixing automatically said substantially vertical support pole in a particular position, and (b) allowing movement automatically after assembly of said at least one support arm and associated at least one support surface to a predefined range of movement relative to said at least one bushing in order to locate said mass of said modular and cooperating components to a particular range of stable positions.

13. An apparatus for supporting modular and cooperating components, according to claim 12:

wherein said substantially vertical support pole includes at least one latching cavity therein;

wherein said sleeve member of said base member includes at least one key-feed port extending therethrough;

said apparatus for supporting modular and cooperating components further comprising:

a locking key which passes through said at least one key-feed port and engages said at least one latching cavity, when said at least one key-feed port and said at least one latching cavity are aligned.

14. An apparatus for supporting modular and cooperating components, according to claim 12:

wherein said at least one key-feed port includes an internally threaded portion; and wherein said locking key includes an externally threaded portion for engaging said internally threaded portion of said at least one key-feed port.

15. An apparatus for supporting modular and cooperating components, according to claim 14:

wherein said locking key includes a knob portion which is utilized during installation to engage said at least one latching cavity with said locking key.

16. An apparatus for supporting modular and cooperating components, according to claim 13:

wherein engagement of said at least one latching cavity with said locking key restricts rotation of said substantially vertical support pole.

17. An apparatus for supporting modular and cooperating components, according to claim 12:

wherein said at least one bushing is rotatable relative to said substantially vertical support pole over a predetermined rotation range.

18. An apparatus for supporting modular and cooperating components, according to claim 12:

wherein said at least one bushing includes (a) a hub portion which is rotatable and which includes a central bore for concentrically receiving said substantially vertical support pole, and (b) a hub pin for maintaining said hub portion in a fixed axial position relative to said substantially vertical support pole.

19. An apparatus for supporting modular and cooperating components, according to claim 18:

wherein a lower portion of said hub portion engages said hub pin.

20. An apparatus for supporting modular and cooperating components, according to claim 19:

wherein said lower portion of said hub portion includes at least one contoured portion to define a predetermined range of permissible rotation for said hub portion.

21. An apparatus for supporting modular and cooperating components, according to claim 20:

wherein said at least one contoured portion comprises castellation which limits rotation of said hub portion to said predefined range of permissible rotation.

22. An apparatus for supporting modular and cooperating components, according to claim 18:

wherein said at least one bushing further includes (c) a bushing insert carried within said hub portion, which includes a particular contoured portion which limits rotation of said hub portion to a predefined range of permissible rotation for said hub portion.

23. An apparatus for supporting modular and cooperating components, according to claim 22:

wherein said contoured portion of said bushing insert slidably engages said hub pin over a predetermined region on said contoured portion of said bushing insert.

24. An apparatus for supporting modular and cooperating components, according to claim 20, further comprising:

a sheath for enclosing said conductors which extends between said modular and cooperating components.

25. An apparatus for supporting modular and cooperating components, according to claim 18:

wherein said hub portion further includes a contoured lower portion between stop members;

wherein said hub pin includes (a) an eyelet portion for receiving and securing conductors which extend between said modular and cooperating components, (b) a load bearing portion for engaging a lowermost portion of said hub portion and preventing downward axial displacement and (c) a range limiting portion for slidably engaging said contoured lower portion of said hub portion between said stop members to allow a predetermined range of rotational movement relative to said substantially vertical support pole.

26. An apparatus for supporting modular and cooperating components, according to claim 25:

wherein said hub portion includes a bushing insert which defines said contoured lower portion.

27. An apparatus for supporting modular and cooperating components, according to claim 18:

wherein each of said at least one bushing further includes (c) a bushing insert which is adapted to be inserted concentrically within said hub portion in a preselected orientation.

28. An apparatus for supporting modular and cooperating components, according to claim 18:

wherein said substantially vertical support pole includes a plurality of bushing station ports which extend therethrough and which define a plurality of possible axial positions for engagement of a selected one of said at least one bushing.

29. An apparatus for supporting modular and cooperating components, according to claim 28:

wherein, during installation, said hub pin is inserted in a particular one of said plurality of bushing station ports, and said hub portion is lowered over said substantially vertical support pole into engagement with said hub pin.

* * * * *